United States Patent [19]

Hiraka et al.

[11] Patent Number: 5,242,722
[45] Date of Patent: Sep. 7, 1993

[54] STRAIN SENSOR

[75] Inventors: Masahiro Hiraka, Ikoma; Haruhiko Handa, Neyagawa; Masaki Ikeda; Akihiko Yoshida, both of Hirakata; Yoshihiro Watanabe, Osaka; Masahiro Kawamura, Takatsuki, all of Japan

[73] Assignee: Matsushita Electric Industrial Co., Ltd., Osaka, Japan

[21] Appl. No.: 784,261

[22] Filed: Oct. 29, 1991

[30] Foreign Application Priority Data

Oct. 29, 1990 [JP] Japan ............................ 2-292403
Mar. 15, 1991 [JP] Japan ............................ 3-50993
Mar. 18, 1991 [JP] Japan ............................ 3-52129
Aug. 8, 1991 [JP] Japan ............................ 3-199406

[51] Int. Cl.⁵ .......................... G01L 1/22; B32B 7/00
[52] U.S. Cl. ................................ 428/34.6; 428/34.4; 428/913; 73/517 R; 338/2; 338/4; 338/307; 338/308; 356/32
[58] Field of Search .......... 73/517 R, 862.65–862.69, 73/862.38, 862, 763, 768, 774; 338/2, 4, 307, 308; 356/32; 428/34.1, 34.6, 432, 913, 660, 666, 674, 680, 681, 689, 697, 34.4

[56] References Cited

U.S. PATENT DOCUMENTS 4,786,887 11/1988 Bringmann et al. .................. 338/2
4,894,635 1/1990 Yajima .................................. 338/2

FOREIGN PATENT DOCUMENTS 2606875 5/1988 France .
6026230 8/1979 Japan .
1589083 8/1990 U.S.S.R. .

Primary Examiner—George F. Lesmes
Assistant Examiner—Charles R. Nold
Attorney, Agent, or Firm—Ratner & Prestia

[57] ABSTRACT

This is to introduce a strain sensor of high quality and excellent durability. This strain sensor is composed of a basic metal body, a crystallized glass layer formed over the surface of the basic metal body, and a resistance element that changes its resistance value by strain changes and is built on the glass layer surface. By this structure, where the crystallized glass layer fired at a high temperature is employed, both of the composition, the basic metal body and the glass layer, are fused with each other at the boundary plane, making their adhesion very strong. No peeling between the basic metal body and the glass layer will take place even under the severe environmental conditions such as high temperature and heavy load.

10 Claims, 6 Drawing Sheets

BASIC METAL BODY
↓
DEGREASING・ACID WASH-OFF
↓
Ni PLATING
↓
GLASS LAYER COATING
↓
FIRING AT 880°C FOR 10 MINUTE
↓
CRYSTALLIZED GLASS LAYER
↓
Ag-Pd PRINTING・FIRING AT 850°C
↓
RESISTANCE ELEMENT (Cu-Ni) PRINTING
・FIRING AT 830°C
↓
STRAIN SENSOR

BASIC METAL BODY 
FIG. 2B
↓
CRYSTALLIZED GLASS LAYER 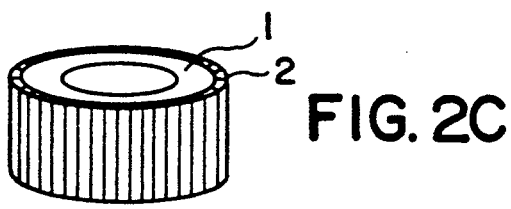
FIG. 2C
↓
ACID WASH-OFF
↓
CATALYST DIPPING 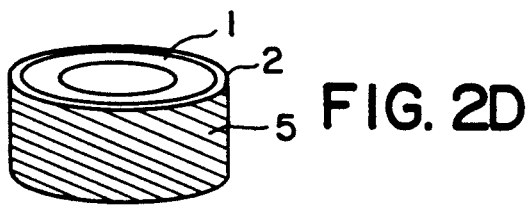
FIG. 2D
↓
PLATING RESIST PRINTING 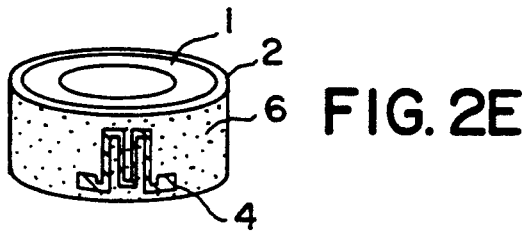
FIG. 2E
↓
HARDENING TREATMENT
↓
ELECTROLESS PLATING 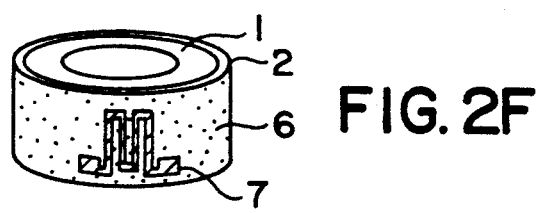
FIG. 2F
↓
STRAIN SENSOR 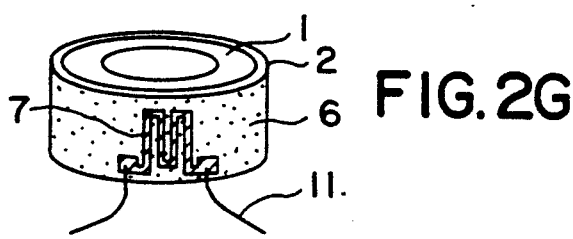
FIG. 2G
FIG. 2A

STRAIN SENSOR

BACKGROUND OF THE INVENTION

This invention relates to strain sensors of a resistance element utilizing the phenomena of a resistance element which changes its electrical resistance in response to a variation in strain.

In recent years, strain sensors have been widely used to detect the magnitude of stress and load as applied to the various places of machines, ships, automobiles, etc. One of the representative types of the strain sensors is one which has a structure with thin film resistance elements made of Cu-Ni alloy, Ni-Cr alloy, or similar material, formed by deposition or sputtering on resin films of polyester, epoxy, polyimide, etc. Also, as disclosed in Japanese Patent Publication No 03-20682/91, there is a strain sensor which uses glass plates in place of the resin films as described above.

These strain sensors are usually attached by applying an adhesive cyano-acrylate resin onto the surface of the places where stress or load is to be measured. In the case of glass plate sensors, the glass plate is attached by melting to the measurement surface.

When an external stress or load is applied to a body, the strain caused by the external stress or load is propagated through the resin film or the glass plate to the resistance element. Such a propagated strain changes the cross-sectional area of the resistance element causing a variation in electrical resistance values of the resistance element. By detecting the variation in resistance in the form of an electrical signal, the magnitude of strain is measured and consequently the stress or load as imposed onto the measurement place is known.

Incidentally, one of the largest applications of strain sensors is the suspension mechanism for vehicles such as automobiles, etc. In this application, strain sensors are attached by applying adhesive resin to the surface of shafts, for example, of suspension mechanisms. The strain sensors as installed in this way will detect the load of the vehicle body as applied through the wheels.

However, in the application of vehicle suspensions, the operating temperature ranges from $-50°$ C. to $150°$ C. and the maximum load reaches as much as 2 tons. When the strain sensors are used under such a severe environment for a long period, the strength of the adhesive resin is deteriorated and the sensors peel off from the surface of the measurement places. Especially, in the case of glass plate sensors, the glass plates have to be attached by melting onto the curved surface of measurement bodies like wheel shafts. Coupled with the problem of rather weak adhesiveness of glass plates, the strain sensors of the glass plate structures are liable to peel off easily. Therefore, a strain sensor of high quality and excellent durability is desired so that the sensor does not peel off after a long period of usage under such severe environmental conditions as described above.

SUMMARY OF THE INVENTION

The object of this invention is to provide strain sensors of high quality and excellent durability. In order to achieve the above object, the strain sensors of this invention comprise a basic metal body, a layer made from a crystallized glass material formed on the surface of the basic metal body and a resistance element which is built on the surface of the glass layer and has a resistance which is changed by variations in strain.

The strain sensors of this invention are used by being mounted on the measurement body to which stress or load is applied. The strain generated within the measurement body by external stress or load is propagated to the basic metal body and then the strain, propagated from the metal body through the glass layer, changes the resistance value of resistance elements. Thus, the magnitude of stress or load as applied to the measurement body can be measured by detecting the electrical resistance changes of the resistance element.

The strain sensors of this invention employ a glass layer made from crystallized glass materials which are prepared by high temperature firing. The ingredients of this glass layer and those of the basic metal body are fused in their boundary regions and the connection at the junction between the two is very strong. Therefore, even under the severe environmental conditions as explained previously, no peeling will take place between the basic metal body and the glass layer.

BRIEF DESCRIPTION OF THE DRAWINGS

FIG. 2A is the production process chart of a strain sensor made by the plating method which is another example of this invention.

FIG. 2B-2G illustrate a strain sensor in accordance with an exemplary embodiment of the present invention at various stages of the production process illustrated by FIG. 2A.

DESCRIPTION OF THE PREFERRED EMBODIMENTS

Figures 1A, 1B:
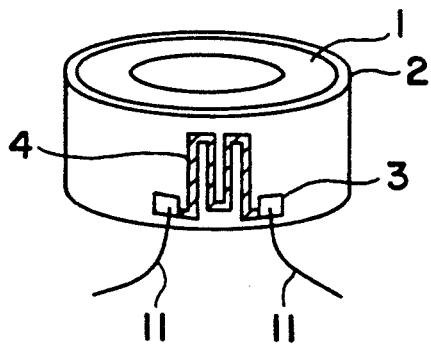
FIG. 1A shows a strain sensor in accordance with an exemplary embodiment of the present invention.
FIG. 1B shows the production process chart of a strain sensor produced by the printing method which is one example of this invention.

A detailed explanation will be made on the stain sensors of this invention in a specific manner in the following.

(1) Basic Metal Body

The basic metal body as used in this invention is such metals or alloys as low carbon steel, stainless steel, silicon steel, Ni-Cr-Fe, Ni-Fe, (including commercial alloys, e.g. Kovar, Invar) etc., and also their cladded combinations. Particularly, the metallic materials as used in this invention are preferred to be the stainless steel of an expansion coefficient ranging from 100 to $140\times10^{-7}/°$ C. to match that of the glass layer.

Once a specific kind of metallic material is selected, shape processing, hole processing, and other desired steps are applied to the material by means of normal machining, etching, laser processing, etc. The configuration of metal materials for above processing is decided according to the magnitude of mechanical load or the kind of applications. Configurations of cylinder, plate, including foil, and the like, will be employed.

Those basic metal bodies are processed through a surface degreasing, then are plated variously with Ni, Co, or similar elements, or with oxide coatings through a heat oxidization treatment in order to make sure a tight contact exists between the basic metal body and the glass layer.

(2) Glass Layer

The glass layer is selected with regard to its electrical insulation and heat resistance. A preferred glass material is a nonalkaline crystallized glass, which will precipitate by firing crystallines of MgO for example. More specifically, the following glass compositions are preferred:

MgO in 16–50% by weight, $SiO_2$ in 7–30% by weight,
$B_2O_3$ in 5–34% by weight, BaO in 0–50% by weight,
$La_2O_3$ in 0–40% by weight, CaO in 0–20% by weight,
$P_2O_5$ in 0–5% by weight and $XO_2$ in 0–5% by weight, where X should be at least one element selected from Zr, Ti and Sn.

One of the reasons why crystallized glass is used is to ensure a tight contact between the basic metal body and the glass layer. The compositions as enumerated above will achieve this purpose of tight contacting particularly well.

To coat the crystallized glass over the basic metal body, an ordinary spray method, an electrophoresis deposition method, or other similar methods, are employed. The electrophoresis deposition method is considered as the most preferred method for fine coating, good electrical insulation, etc.

In this method, glass and alcohol and a little amount of water are mixed in a ball mill for approximately 20 hours to get an average glass particle size of 1 to 5 $\mu$m. The resultant slurry is placed in an electrolysis tank and the solution is circulated. Then, a basic metal body is dipped in this slurry and glass particles are separated on the surface of the basic metal body by negative polarization at 100 to 400 volts. After drying, this is fired at 850° to 900° C. for 10 to 60 minutes. In this way, the fine particles of glass are fused. At the same time, the glass component and the metal material component are fused into each other well enough, realizing a very tight contact between the glass layer and the basic metal body.

A preferred process is to increase the temperature gradually from room temperature to the specified temperature. By this process of firing, many fine needle shaped crystals are precipitated, strengthening the connection with resistance elements by an effective working of the anchor effect as described later.

Another reason for using the crystallized glass is to get a higher heat resistance temperature of the glass layer. When resistance elements are formed on the glass layer by firing, the firing temperature is high and the heat resistance temperature of the glass layer has to be at least 900° C. The glass as used in this invention shows a heat resistance temperature of 650° C. when it is amorphous (non-crystallized), and the heat resistance temperature increases to 900° C. and over once it is crystallized. (Yet, the glass is not fluid at 900° C. and resistance elements can be deposited by firing at 850° C. without any problems.)

On the other hand, if an ordinary amorphous glass is used, heat resistance does not improve at all since crystallization does not occur by re-heating. (The glass becomes fluid at approximately 600° C. and resistance elements will react with the glass by firing at 600° C. and over.)

(3) Resistance Elements

Cu-Ni alloy, Ni-Cr alloy, ruthenium oxide, etc. are used as the materials for resistance elements. These materials have characteristics of changing their electrical resistance in response to changes in strain.

The methods as used in the strain sensors of this invention for making resistance elements are preferably the printing method, plating method or transfer printing method as described in the following:

In the printing method, metal-organic compounds are used as the raw materials and, with these compounds as the principal material, resistor pastes are prepared. Then, the paste is printed on the surface of the glass layer, and the metal and the alloy films that compose the resistance elements are formed by thermal decomposition. The metal-organic compounds are made up from the groups of Ni, Cr, Cu, Fe and Ru to make resistance elements and are mixed with additives that include at least two kinds of the thermal decomposition organic compound composed from Bi, Rh, V and Sb. By this material composition, the conventional thick film technology can realize a film thickness equal to the one made by the thin film technology.

Another method for producing resistance elements is to print a paste composed mainly from ruthenium oxide and glass frits onto the glass layer, and then to apply firing to it. The paste is made from, in addition to ruthenium oxide and glass frits (like borosilicate glass), ingredients such as zirconium oxide, bismuth oxide, ethyl cellulose, butyl carbitol acetate (terpineol is also acceptable), etc.

When the plating method is used for making resistance elements, the alloy plating films of Cu-Ni-P, Ni-Cr-P, or Ni-Fe-P are selected in consideration of strain sensitivity, resistance temperature coefficient, etc.

The above plating film has to be made in a fine pattern for the application of resistance elements used in load sensors. To form such fine patterns, a specified pattern is formed either by a laser cutting method, or by a photolithography which eliminates unnecessary portions, after the plating films are made all over the surface. However, fine patterns cannot be made easily by these methods on a curved surface.

For solving this problem, a plating resist, which has an excellent chemical resistance against plating solutions, is printed on the places where resistor patterns should be formed, and then is processed through hardening. Then, an electroless plating is applied to form resistance element patterns. For this method, it is essential to use a plating resist which is resistant to the high temperature (80°~95° C.) plating solutions of strong acid or strong alkali, and has a good printability and also a short hardening time. For such a plating resist, for example, there is a suitable one like acrylic resin of ultraviolet ray hardening.

An electroless plating is well-suited for this invention. A metal complex and a reducing agent (like hypophosphorous acid) are contained in plating solutions. The electrons released by oxidation of the reducing agent will permit the metal ions of the complex precipitate as metal on the surface to be plated. The reaction in the case of Ni, for example, is expressed in brief as in the following:

$$Ni^{2+}-Complex + H_2PO_2^- + 30H^- \rightarrow Ni + H_2PO_2^- + 2H_2O + Complex$$

In case the material to be plated is a metal, the exchange between metal ions of plating solutions and the material to be plated occurs at the early stage of the immersion step, and then a reductive action takes place with the separated metal acting itself as a catalyst and accelerating smoothly the reduction. On the other hand, when the material to be plated is an insulator, there are no cores of reaction, and the ions of Sn (tin chloride) and Pd (palladium chloride) are absorbed on the insulator, and then a reducing reaction takes place. After that, the precipitated metal will act as a self-catalyser, advancing the reactions one after another.

The crystallized glass of this invention is porous since there are fine needle-like crystals on its surface. When a plating is applied to the surface, the reducing reaction starts from the inside of the glass and an anchoring effect of plating layers takes place, consequently bringing about a strong adhesion between plating layer and glass. In contrast to this, the surface of ordinary amorphous glass or plastics is very smooth and no anchoring effect will be taking place, resulting in poor adhesion.

In addition, when resistance elements are formed by the electroless plating method, a catalytic layer composed on tin, palladium, etc. is made on the glass surface and then the resistance elements are built on the catalyser surface, realizing a good anchoring effect with a stronger adhesive strength between the glass layer and the resistance elements.

When a transfer printing method is employed to make resistance elements, it is preferred to use Cu-Ni alloy foil or Ni-Cr alloy foil as the resistance element materials. In this case, an organic resin is printed on the one side of the alloy foil and then, after a resist is coated on the other side, an etching process is applied to obtain the pattern which is required of the resistance elements. The resistance elements thus prepared are then set up on the glass surface of the basic metal body through the above organic resin, finally being fired to complete the resistance elements.

The purpose of using the organic resin is to fix the alloy foil which is needed in forming the resistance elements. After the resistance elements have been fixed onto the glass surface, the organic resin will be eliminated at the time of firing. The organic resin should have a good combustibility. Also, it should have no adverse effects on the glass layer and the alloy foil.

These organic resins may be acrylic resins and polyvinyl chloride resins. Polymethacrylic ester or polyacrylic ester may be used as the acrylic resin. Also, a copolymer of polyvinyl chloride resin and acrylic resin may be used.

These resins have a smaller heat shrinkage compared with other resins, such as polyester, polyimide or epoxy resins, as used in the ordinary printed circuit boards. Besides, they have a good combustibility and make it possible to have the circuit patterns of the alloy foil transferred accurately onto the glass layer. The above resins are dissolved in an appropriate solvent. After the viscosity is adjusted, the resins are coated over the alloy foil by a spraying or printing method, or the resin films are laminated with the alloy foils.

The above methods of forming resistance elements by printing, plating and transfer can also be used to make the resistance elements easily on the glass surface which has been built on the sides of a cylindrical basic metal body. These methods are also economical and suitable to mass-production. Some examples of the specific applications of this invention will be presented in the following:

EXAMPLE 1

A crystallized glass layer of 100μm with a composition as shown in Table 1 was electrically precipitated by the electrophoresis method on the surface of the SUS430 basic body (100 mm ×100 mm ×0.5 mm) and then fired at 880° C. for 10 minutes, by following the glass coating process described previously. The samples thus prepared were then investigated in various characteristics such as surface roughness, waviness, heat resistance, etc. The results of the investigation are shown in Table 1, together with the crystallized glass composition data. The roughness was measured using a Talysurf surface roughness measuring instrument and it is expressed by the average roughness along the surface center line, Ra. The waviness is expressed by the difference, Rmax, between peak and valley points as measured by a Talysurf surface roughness measuring instrument.

The heat resistance was checked by placing the samples in an electric furnace of 850° C. for 10 minutes and then taking them out of the furnace and keeping at room temperature for 30 minutes. This cycle was repeated and the samples were subjected to the so called spalling test. The conditions of the samples were examined in terms of cracking and flaking. The existence of cracks was checked by a visual observation after immersing the samples in red ink and then wiping off the ink from the surface of the samples. In Table 1, the sign "○" shows there were no cracks after 10 cycles, the sign "Δ" some cracks between 5 and 9 cycles, and the sign "X" some cracks before 4 cycles.

The adhesion of the glass layer was checked by bending the basic body. The sign "X" shows that the glass layer peeled off and the entire metal portion was exposed, the sign "Δ" shows that a part of the metal was exposed and the sign "○" shows no part of the metal was showing at all. The overall evaluation is given by means of signs "○", "Δ" and "X". Numbers 1 through 8 are the cases where the concentrations of $SiO_2$ and $B_2O_3$ were changed with the concentrations of other contents kept unchanged. Numbers 9 through 15 are the samples with the concentration of MgO changed and the $SiO_2/B_2O_3$ ratio kept unchanged, whereas in Numbers 16 through 19, CaO concentration was changed in place of MgO. In Numbers 25 through 29, $La_2O_3$ concentration was changed with the $SiO_2/B_2O_3$ ratio kept unchanged. Numbers 30 through 42 explain the effects of $ZrO_2$, $TiO_2$, $SnO_2$, $P_2O_5$ and ZnO. As Table 1 explicitly indicates, heat resistance is improved while surface conditions and adhesion are deteriorated with increased $SiO_2$ concentration. In contrast with this, surface conditions and adhesiveness will become better while heat resistance is not good with increasing $B_2O_3$. In this invention, therefore, the range of $SiO_2$ concentration 7 to 30% by weight and the range of $B_2O_3$ concentration is 5 to 34% by weight.

MgO aids crystallization and with less than with 16% MgO by weight, crystallization does not take place easily, and the glass layer's heat resistance is poor. With more than 50% MgO by weight, crystallization takes place easily and uniform glass is not formed causing the surface roughness to increase, since the glass is crystallized during the glass melting process.

When CaO is added by more than 20% by weight, the surface condition becomes poor. With BaO added by more than 50% by weight, heat resistance and adhesion are deteriorated. With more than 40% by weight of $La_2O_3$, heat resistance is not good. There are other acceptable additives such as $ZrO_2$, $TiO_2$, $SnO_2$, $P_2O_5$, ZnO etc. only when they are not exceeding the limit of 5% by weight.

TABLE 1

| Composition No. | 1 | 2 | 3 | 4 | 5 | 6 | 7 | 8 | 9 |
|---|---|---|---|---|---|---|---|---|---|
| Composition a/o by weight | | | | | | | | | |
| MgO | 39 | 39 | 39 | 39 | 39 | 39 | 39 | 39 | 10 |
| BaO | 12 | 12 | 12 | 12 | 12 | 12 | 12 | 12 | 10 |
| CaO | 3 | 3 | 3 | 3 | 3 | 3 | 3 | 3 | 3 |
| $La_2O_3$ | 5 | 5 | 5 | 5 | 5 | 5 | 5 | 5 | 5 |
| $B_2O_3$ | 0 | 5 | 10 | 15 | 25 | 30 | 31 | 33 | 46 |
| $SiO_2$ | 38 | 33 | 28 | 23 | 13 | 8 | 7 | 5 | 23 |
| $ZrO_2$ | 2 | 2 | 2 | 2 | 2 | 2 | 2 | 2 | 2 |
| $TiO_2$ | | | | | | | | | |
| $SnO_2$ | | | | | | | | | |
| $P_2O_5$ | 1 | 1 | 1 | 1 | 1 | 1 | 1 | 1 | 1 |
| ZnO | | | | | | | | | |
| $SiO_2/B_2O_3$ | ∞ | 6.6 | 2.8 | 1.53 | 0.52 | 0.27 | 0.22 | 0.15 | 0.50 |
| Surface Roughness | 0.6 | 0.5 | 0.46 | 0.38 | 0.05 | 0.06 | 0.06 | 0.08 | 0.09 |
| Waviness | 5.2 | 3.3 | 3.2 | 2.5 | 0.5 | 1.0 | 1.0 | 0.9 | 1.2 |
| Heat Resistance | ○ | ○ | ○ | ○ | ○ | ○ | ○ | X | X |
| Adhesion | ○ | ○ | ○ | ○ | ○ | ○ | ○ | ○ | ○ |
| Total Evaluation | X | ○ | ○ | ○ | ○ | ○ | ○ | X | X |

| Composition No. | 10 | 11 | 12 | 13 | 14 | 15 | 16 | 17 | 18 |
|---|---|---|---|---|---|---|---|---|---|
| Composition a/o by weight | | | | | | | | | |
| MgO | 10 | 20 | 29 | 40 | 50 | 55 | 40 | 40 | 40 |
| BaO | 10 | 10 | 10 | 10 | 10 | 10 | 5 | 5 | 5 |
| CaO | 3 | 3 | 3 | 3 | 3 | 3 | | 10 | 20 |
| $La_2O_3$ | 5 | 5 | 5 | 5 | 5 | 5 | 5 | 5 | 5 |
| $B_2O_3$ | 42 | 39 | 33 | 26 | 19 | 16 | 31 | 25 | 18 |
| $SiO_2$ | 21 | 20 | 17 | 13 | 10 | 8 | 16 | 12 | 9 |
| $ZrO_2$ | 2 | 2 | 2 | 2 | 2 | 2 | 2 | 2 | 2 |
| $TiO_2$ | | | | | | | | | |
| $SnO_2$ | | | | | | | | | |
| $P_2O_5$ | 1 | 1 | 1 | 1 | 1 | 1 | 1 | 1 | 1 |
| ZnO | | | | | | | | | |
| $SiO_2/B_2O_3$ | 0.5 | 0.51 | 0.52 | 0.5 | 0.53 | 0.5 | 0.52 | 0.48 | 0.5 |
| Surface Roughness | 0.08 | 0.07 | 0.05 | 0.07 | 0.10 | 0.18 | 0.08 | 0.05 | 0.09 |
| Waviness | 1.1 | 0.5 | 0.9 | 0.5 | 0.8 | 1.5 | 0.20 | 0.6 | 0.9 |
| Heat Resistance | ○ | ○ | ○ | ○ | ○ | ○ | ○ | ○ | ○ |
| Adhesion | ○ | ○ | ○ | ○ | ○ | Δ | ○ | ○ | ○ |
| Total Evaluation | ○ | ○ | ○ | ○ | ○ | X | ○ | ○ | ○ |

| Composition No. | 19 | 20 | 21 | 22 | 23 | 24 | 25 | 26 | 27 |
|---|---|---|---|---|---|---|---|---|---|
| Composition a/o by weight | | | | | | | | | |
| MgO | 40 | 20 | 20 | 20 | 20 | 20 | 30 | 30 | 30 |
| BaO | 5 | | 20 | 40 | 50 | 60 | 5 | 5 | 5 |
| CaO | 25 | 2 | 2 | 2 | 2 | 2 | 2 | 2 | 2 |
| $La_2O_3$ | 5 | 5 | 5 | 5 | 5 | 5 | | 10 | 30 |
| $B_2O_3$ | 15 | 47 | 33 | 20 | 13 | 7 | 40 | 33 | 20 |
| $SiO_2$ | 7 | 23 | 17 | 10 | 7 | 3 | 20 | 17 | 10 |
| $ZrO_2$ | 2 | 2 | 2 | 2 | 2 | 2 | 2 | 2 | 2 |
| $TiO_2$ | | | | | | | | | |
| $SnO_2$ | | | | | | | | | |
| $P_2O_5$ | 1 | 1 | 1 | 1 | 1 | 1 | 1 | 1 | 1 |
| ZnO | | | | | | | | | |
| $SiO_2/B_2O_3$ | 0.47 | 0.49 | 0.52 | 0.5 | 0.54 | 0.43 | 0.5 | 0.52 | 0.5 |
| Surface Roughness | 0.14 | 0.09 | 0.08 | 0.06 | 0.05 | 0.05 | 0.10 | 0.08 | 0.08 |
| Waviness | 1.5 | 0.9 | 0.6 | 0.6 | 0.5 | 0.5 | 1.1 | 0.9 | 0.9 |
| Heat Resistance | ○ | ○ | ○ | ○ | Δ | X | ○ | ○ | ○ |
| Adhesion | ○ | ○ | ○ | ○ | Δ | Δ | ○ | ○ | ○ |
| Total Evaluation | Δ | ○ | ○ | ○ | Δ | X | ○ | ○ | ○ |

| Composition No. | 28 | 29 | 30 | 31 | 32 | 33 | 34 | 35 | 36 |
|---|---|---|---|---|---|---|---|---|---|
| Composition a/o by weight | | | | | | | | | |
| MgO | 30 | 30 | 40 | 40 | 40 | 40 | 40 | 40 | 40 |
| BaO | 5 | 5 | 10 | 10 | 10 | 10 | 10 | 10 | 10 |
| CaO | 2 | 2 | 3 | 3 | 3 | 3 | 3 | 3 | 3 |
| $La_2O_3$ | 40 | 45 | 5 | 5 | 5 | 5 | 5 | 5 | 5 |

TABLE 1-continued

| | | | | | | | | | |
|---|---|---|---|---|---|---|---|---|---|
| $B_2O_3$ | 13 | 7 | 27 | 24 | 23 | 27 | 24 | 23 | 27 |
| $SiO_2$ | 7 | 3 | 14 | 12 | 11 | 14 | 12 | 11 | 14 |
| $ZrO_2$ | 2 | 2 | | 5 | 7 | | | | |
| $TiO_2$ | | | | | | | 5 | 7 | |
| $SnO_2$ | | | | | | | | | |
| $P_2O_5$ | 1 | 1 | 1 | 1 | 1 | 1 | 1 | 1 | 1 |
| ZnO | | | | | | | | | |
| $SiO_2/B_2O_3$ | 0.54 | 0.43 | 0.52 | 0.5 | 0.49 | 0.52 | 0.5 | 0.49 | 0.52 |
| Surface Roughness | 0.07 | 0.06 | 0.05 | 0.08 | 0.12 | 0.05 | 0.08 | 0.13 | 0.05 |
| Waviness | 0.9 | 0.8 | 0.5 | 0.9 | 1.5 | 0.5 | 1.0 | 1.6 | 0.6 |
| Heat Resistance | Δ | X | ○ | ○ | ○ | ○ | ○ | ○ | ○ |
| Adhesion | ○ | ○ | ○ | ○ | ○ | ○ | ○ | ○ | ○ |
| Total Evaluation | Δ | X | ○ | ○ | X | ○ | ○ | X | ○ |

| Composition No. | 37 | 38 | 39 | 40 | 41 | 42 |
|---|---|---|---|---|---|---|
| Composition a/o by weight | | | | | | |
| MgO | 40 | 40 | 40 | 40 | 40 | 40 |
| BaO | 10 | 10 | 10 | 10 | 10 | 10 |
| CaO | 3 | 3 | 3 | 3 | 3 | 3 |
| $La_2O_3$ | 5 | 5 | 5 | 5 | 5 | 5 |
| $B_2O_3$ | 24 | 23 | 28 | 24 | 23 | 27 |
| $SiO_2$ | 12 | 11 | 14 | 12 | 11 | 14 |
| $ZrO_2$ | | | | | | |
| $TiO_2$ | | | | | | |
| $SnO_2$ | 5 | 7 | | | | |
| $P_2O_5$ | 1 | 1 | 1 | 1 | 1 | 1 |
| ZnO | | | | 5 | 7 | |
| $SiO_2/B_2O_3$ | 0.5 | 0.49 | 0.5 | 0.5 | 0.49 | 0.52 |
| Surface Roughness | 0.09 | 0.12 | 0.06 | 0.08 | 0.13 | 0.05 |
| Waviness | 0.9 | 1.6 | 0.7 | 1.0 | 1.6 | 0.6 |
| Heat Resistance | ○ | ○ | ○ | ○ | ○ | ○ |
| Adhesion | ○ | ○ | ○ | ○ | ○ | ○ |
| Total Evaluation | ○ | X | ○ | ○ | X | ○ |

EXAMPLE 2

An explanation will be made on the strain sensor illustrated in FIG. 1A when the resistance element is formed by the printing method as described in the production process chart of FIG. 1B.

A cylindrical basic metal body 1, 20 mm in diameter and 2 mm in thickness, is pre-processed through the steps of degreasing, washing by water, acid washing off, washing by water, nickel plating and again washing by water. Then it is immersed in the slurry of glass particles with the composition No. 7 of Table 1. Under this condition, a DC voltage is applied between an opposing electrode and the cylindrical metal body for coating the side of the cylindrical basic metal body. Then, the entire body is subjected a temperature rise from room temperature to 880° C. over 4 hours and fired at 880° C. for 10 minutes. In this way, a crystallized glass layer 2 is formed on the basic metal body.

Electrodes 3 are made over the crystallized glass layer 2 by screen printing Ag-Pd pastes for a pattern print and then by firing it at 850° C. Between those electrodes, the pastes of metal-organic compounds, which are made from Cu and Ni respectively, are printed to a given pattern and fired at 830° C.

Thus, the resistance element 4 of Cu-Ni alloy is fabricated to make a strain sensor. Number 11 of FIG. 1 indicates lead wires which connect to the electrode 3.

EXAMPLE 3

This example uses a paste of the principal composition made up from ruthenium oxide and glass frits in place of the one used in Example 2, with all other conditions such as materials and processing methods kept the same as in Example 2.

EXAMPLE 4

This example describes a strain sensor with the resistance element prepared by the plating method as shown in the production process chart of FIG. 2A.

A cylindrical basic metal body 1 (FIG. 2B), 20 mm in outer diameter and 2 mm in thickness, is subjected to a series of pre-processing such as degreasing, washing by water, acid washing off, washing by water, nickel plating and again washing by water. Then it is immersed in a slurry made from the glass particles of the number 7 composition as listed in Table 1.

Under this state, a DC voltage is applied between an opposing electrode and the cylindrical metal for coating over the surface of the cylindrical metal. Then, after firing at 880° C. for 10 minutes, a crystallized glass layer 2 is formed FIG. 2C. After acid is washed off the cylindrical basic metal body that is coated with the crystallized glass layer 2, the basic metal body is immersed in tin chloride solution and palladium chloride solution to have tin and palladium catalyst layers 5 absorbed on the surface of crystallized glass layer 2 (FIG. 2D).

Then, plating resists are printed over the curved surface in places where plating should be prevented and then cured by ultraviolet rays, and thus a plating resist film 6 (plating masking layer) is formed (FIG. 2E). The basic metal body is then immersed in the Cu-Ni-P plating solution and an electroless plating is applied at the solution temperature of 70° to 80° C. for forming a plating film 7 over the places where no plating resist is added, (FIG. 2F). Lead wires 11 may then be connected (FIG. 2G).

EXAMPLE 5

Figure 3A:
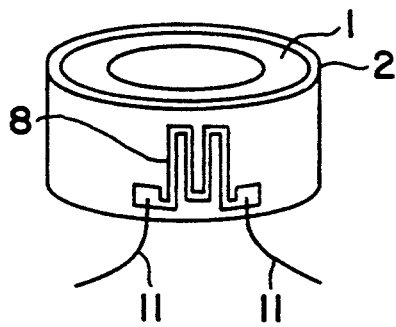
FIG. 3A shows a strain sensor in accordance with a further exemplary embodiment of the present invention.
Figure 3B:
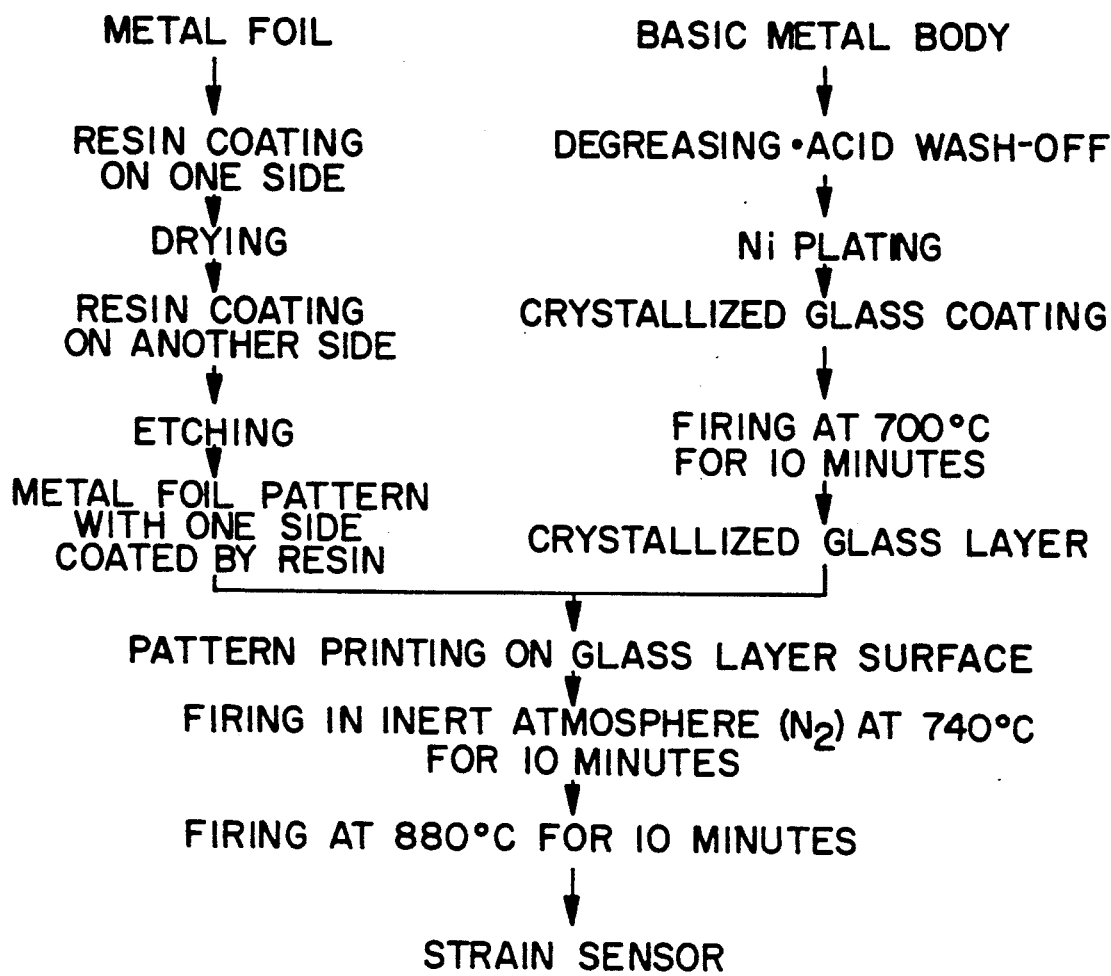
FIG. 3B is the production process chart of a strain sensor utilizing the transfer printing method which is a further example of this invention.

This example describes a strain sensor illustrated in FIG. 3A made by the transfer printing method to form a resistance element as shown in the production process chart of FIG. 3B. A cylindrical basic metal body 1, 20 mm in outer diameter and 2 mm in thickness, is pretreated through the steps of degreasing, washing by water, acid washing off, washing by water, nickel plating and again washing by water. Then, the cylindrical basic metal body is coated on its side surface with the number 7 glass of Table 1 by an electrophoresis method and is fired at 740° C. for 10 minutes, forming a crystallized glass layer 2.

In connection with making resistance element 8, a solution of the organic solvent for acryl resin is coated by a printing method over the one side of a Cu-Ni alloy foil of 10 μm thickness and dried at 100° C. The other side of the alloy foil is also coated by printing with the same organic solvent solution in a specified circuit pattern and dried at 100° C. This alloy film is treated through an etching process to get the circuit pattern needed by the resistance element.

The resin film prepared to have the pattern of resistance element 8 is set up so that resistance element 20 contacts the glass layer and then is subjected to a temperature rise from the room temperature to 880° C. where it is kept for 10 minutes and fired, thus forming the pattern of resistance element 8 on the glass layer by fusion and completing a strain sensor.

EXAMPLE 6

Figure 4:
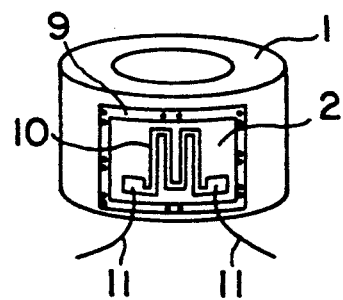
FIG. 4 is a perspective view illustrating one embodiment of a strain sensor of this invention.

FIG. 4 shows a plate-like first basic metal body 9 made of 100 μm thick stainless steel foils, which has been pretreated through degreasing, washing by water, acid wash off, washing by water, nickel plating and again washing by water. Then, the glass of No. 7 composition as listed in Table 1 is coated on a portion of the one side of stainless steel foil using an electrophoresis method and then fired at 880° C. to form a crystallized layer 2. The resistance element 10 of Cu-Ni-P is formed on a glass layer by the same method as described in Example 4, completing a foil-like strain sensor. After this foil strain sensor is degreased and washed by water, it is mounted by spot welding on the second basic metal body 1 of cylindrical shape with 20 mm outer diameter and 2 mm thickness.

COMPARATIVE EXAMPLE 1

Figure 5:
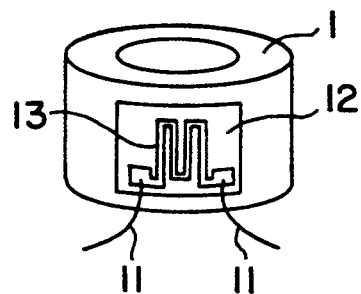
FIG. 5 is a perspective view illustrating a strain sensor in the first comparison example.

As shown in FIG. 5, a cylindrical basic metal body 1 of 20 mm in outer diameter and 2 mm in thickness is degreased and washed by water. Then, a conventional strain sensor of Cu-Ni resistance element 13, built on a polyimide resin film 12, is mounted on the side of the above cylindrical basic metal body 1 by a cyano-acrylate adhesive.

COMPARATIVE EXAMPLE 2

Figure 6:
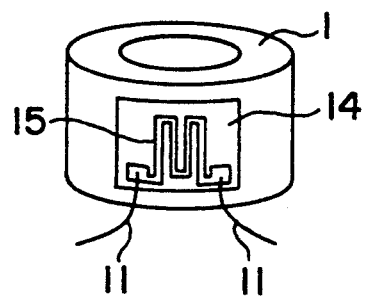
FIG. 6 is a perspective view illustrating a strain sensor in the second comparison example.

As indicated in FIG. 6, a cylindrical basic metal body 1, 20 mm in outer diameter and 2 mm in thickness, is pretreated through the processes of degreasing, washing by water, acid wash-off, washing by water, nickel plating and again washing by water. Then, a glass plate 14 (150 μm thickness) made of potassium lime glass (Matsunami Glass Industries, No. 0030, expansion coefficient: $111 \times 10^{-7}/°C$.) is mounted on the basic metal body 1 and fired to cover partially with glass. Cu-Ni resistance element 15 was formed over this body by a transfer printing method to make a strain sensor.

With regard to the cylindrical strain sensors of Examples 2 to 5, the foil-like strain sensor mounted by welding on a cylindrical basic metal body as explained in Example 6, the strain sensor as mounted by adhesive on a cylindrical basic metal body like Comparative Example 1 and the cylindrical strain sensor of Comparative Example 2, mechanical load tests were conducted to see after how many cycles of load testing, the cylindrical basic metal bodies or the foils are separated from glass layers, cyano-acrylate adhesive layers or glass plates. The load testing was performed by repeatedly applying a pressure of 1 ton for 1 minute along the cylindrical axis of the basic metal body. During this load testing, the surface temperature of the strain sensors was being kept at 200° C. The results of the load testing are shown in Table 2.

TABLE 2

| Example | Peeling Cycles |
| --- | --- |
| Example 2 | No peeling at $10^7$ cycles |
| Example 3 | No peeling at $10^7$ cycles |
| Example 4 | No peeling at $10^7$ cycles |
| Example 5 | No peeling at $10^7$ cycles |
| Example 6 | No peeling at $10^7$ cycles |
| Comparative Example 1 | 125 cycles |
| Comparative Example 2 | 1500 cycles |

Table 2 indicates that the sensors of Examples 2 to 6 indicated no sign of peeling off after the repeated load testing of $10^7$ cycles, and these sensors are extremely durable even under the severe environmental conditions of high temperature and high humidity. Furthermore, the strain sensors of Examples 2 to 6 of this invention were tested in changes of resistance values by using a resistance measurement instrument, measuring resistance values between the ones before and after $10^7$ cycle testing with the result of no difference between the two values. This fact shows that the sensors are very durable.

In Example 6, a basic metal body of 100 μm foil was used. The thickness of the foil can be changed depending on the magnitude of the load for the most suitable one. This means that the metal body can be a relatively thick "thin plate" foil.

In addition, although, resistance elements were used as application examples to detect strain in Examples of this invention, these resistance elements can also be replaced by capacitance elements to build the strain sensors of this invention. The capacitance elements detect changes in strain by changes in capacitance values. $Ta_2O_5$, $TiO_2$, and similar materials are well-suited for such capacitance elements.

Figure 7:
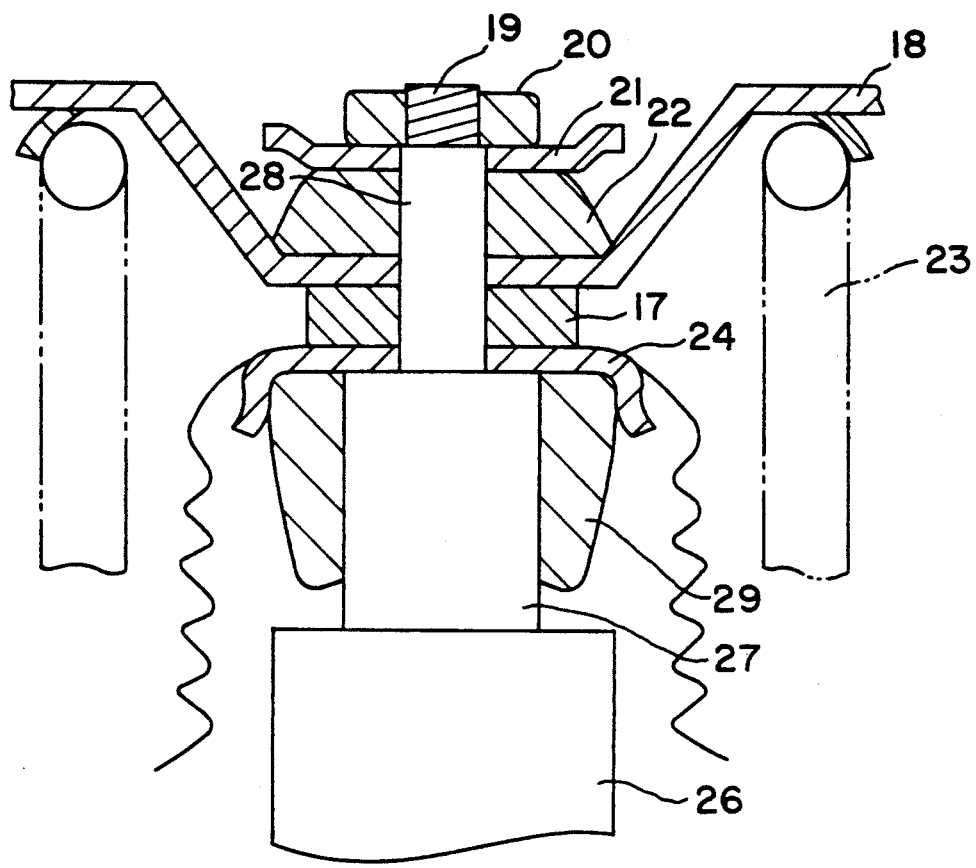
FIG. 7 is a cross-sectional drawing of the vehicle suspension where a strain sensor of this invention is used.

An embodiment of the invention involves the case where the strain sensor described in Example 4 is used in a vehicle suspension, as shown in FIG. 7. In FIG. 7, 18 is the vehicle chassis, 19 is a screw portion of the shock absorber, and 28, 27 and 26 show sections of small, medium and large diameters of the shock absorbers, respectively. The chassis 18 is held firmly between the shoulder, which is formed by a difference in diameters of section 27 and section 28 of the shock absorber, and the nut 20 of the screw portion 19 of the shock absorber. Between the nut 20 and the chassis 18, a washer 21 and a bumper rubber are being held. Between the shoulder, created by the difference in diameters of the mid-diameter section 27 and the small diameter section 28 of the shock absorber, and the chassis 18, a stopper 24 of a bumper rubber 29 and the strain sensor 17 are installed. A suspension spring 23 is fixed, together with the lower portion of the large diameter section 26 of the shock absorber, to the wheels which are not shown in FIG. 7.

The vehicle suspension thus constructed converts changes in the load generated between the chassis and the wheels to a mechanical strain of the metallic elastic body. This strain is further transformed to resistance changes of the resistance element, formed on the glass layer, and then detected as an electrical signal. A plurality of strain sensors can be installed along the axis when required.

Figure 8:
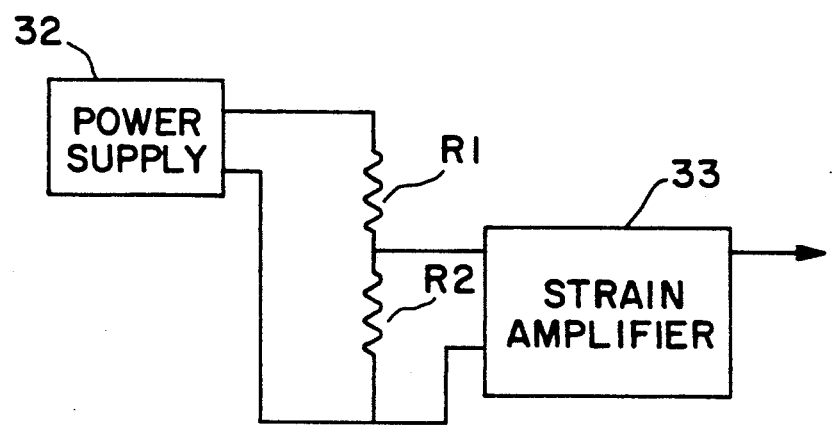
FIG. 8 is one example of the circuit diagram which shows how to convert load to electrical signals by a strain sensor of this invention.

FIG. 8 shows one example of the schematic diagram for conversion to electrical signals. Power Supply 32 supplies a known voltage over the system. The voltage changes at the junction between a fixed resistor $R_1$ and the resistance element $R_2$ of the sensor are taken out as an output after amplification through a strain amplifier 33.

Figure 9:
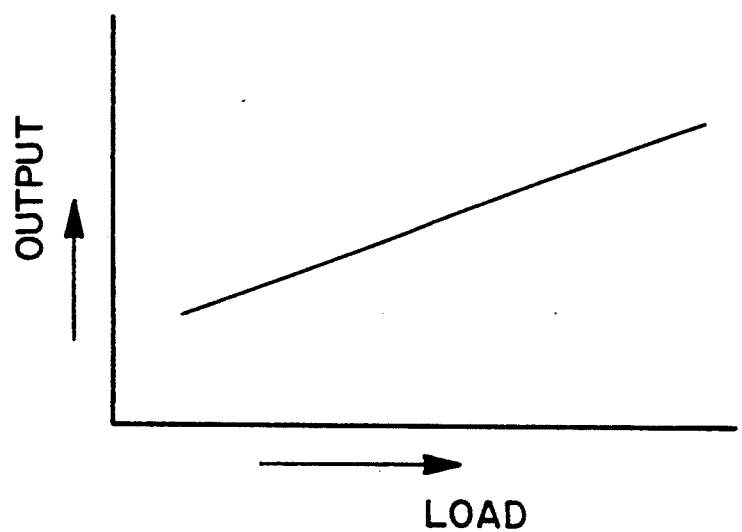
FIG. 9 is a graph showing the relation between weight load and electrical output signals when stain sensors of this invention are used.

FIG. 9 shows the output changes as a function of load. It is clearly seen that the load and the output are in a direct proportional relation within the elastic limit of the basic metal body.

What is claimed:

1. A strain sensor comprising:
   a basic metal body;
   a layer made from a crystalized glass material formed on the surface of said basic metal body, wherein said crystallized glass material comprises MgO at a concentration of 16–50% by weight, $SiO_2$ at a concentration of 7–30% by weight: $B_2O_3$ at a concentration of 5–34% by weight, BaO at a concentration of 0–50% by weight, $La_2O_3$ at a concentration of 0–40% by weight, CaO at a concentration of 0–20% by weight, $P_2O_5$ at a concentration of 0–5% by weight, and $XO_2$ at a concentration of 0–5% by weight, where X is at least one element selected from the group consisting of Zr, Ti and Sn;
   a resistance element which is built on said surface of said glass layer and has a resistance which is changed by a variation in strain.

2. The strain sensor according to claim 1, wherein the shape of said basic metal body is cylindrical, and said glass layer is formed on the outer surface of said cylindrical metal body.

3. The strain sensor according to claim 1, wherein the shape of said basic metal body is plate-shaped, and said glass layer is formed on at least one side of said plate-shaped metal body.

4. The strain sensor according to claim 1, wherein said glass layer is formed first by precipitating glass particles on a surface of said basic metal body using an electrophoresis deposition method and then by firing said glass particles.

5. The strain sensor of claim 1, wherein said resistance element is formed first by printing a paste over said crystallized glass and then by firing said paste.

6. The strain sensor according to claim 5, wherein said paste comprises mainly ruthenium oxide and glass frits.

7. The strain sensor of claim 5, wherein said paste comprises at least one metal-organic compound selected from the group consisting of Ni, Cr, Cu, Fe and Ru.

8. The strain sensor according to claim 1, wherein said resistance element is formed by an electroless plating.

9. The strain sensor according to claim 8, wherein said resistance element is formed on the surface of a catalyst layer which is made over said glass layer.

10. The strain sensor according to claim 1, wherein said resistance element is formed by first placing said resistance element over said glass layer surface by means of an organic resin coating which is applied to one side of said resistance element and then by firing said resistance element.

* * * * *